June 5, 1928. 1,672,202

F. V. CHANEY

DUST GUARD AND METHOD OF MAKING THE SAME

Filed March 16, 1926

Witness
Frederick S. Greenleaf

Inventor
Franklin V. Chaney
by his attorneys
Van Everen Fish Hildreth & Cary

Patented June 5, 1928.

1,672,202

UNITED STATES PATENT OFFICE.

FRANKLIN V. CHANEY, OF BOSTON, MASSACHUSETTS, ASSIGNOR TO CHATON FIBRE COMPANY, OF BOSTON, MASSACHUSETTS, A CORPORATION OF MASSACHUSETTS.

DUST GUARD AND METHOD OF MAKING THE SAME.

Application filed March 16, 1926. Serial No. 95,042.

The present invention relates to an improvement in dust guards and method of making the same.

The object of the present invention is to produce a dust guard of strength and durability, and to produce it by means of a new method, which is inexpensive, rapid and efficient. To the above ends the present invention consists in the dust guard and method of making the same hereinafter described and particularly defined in the claim.

Figure 1:
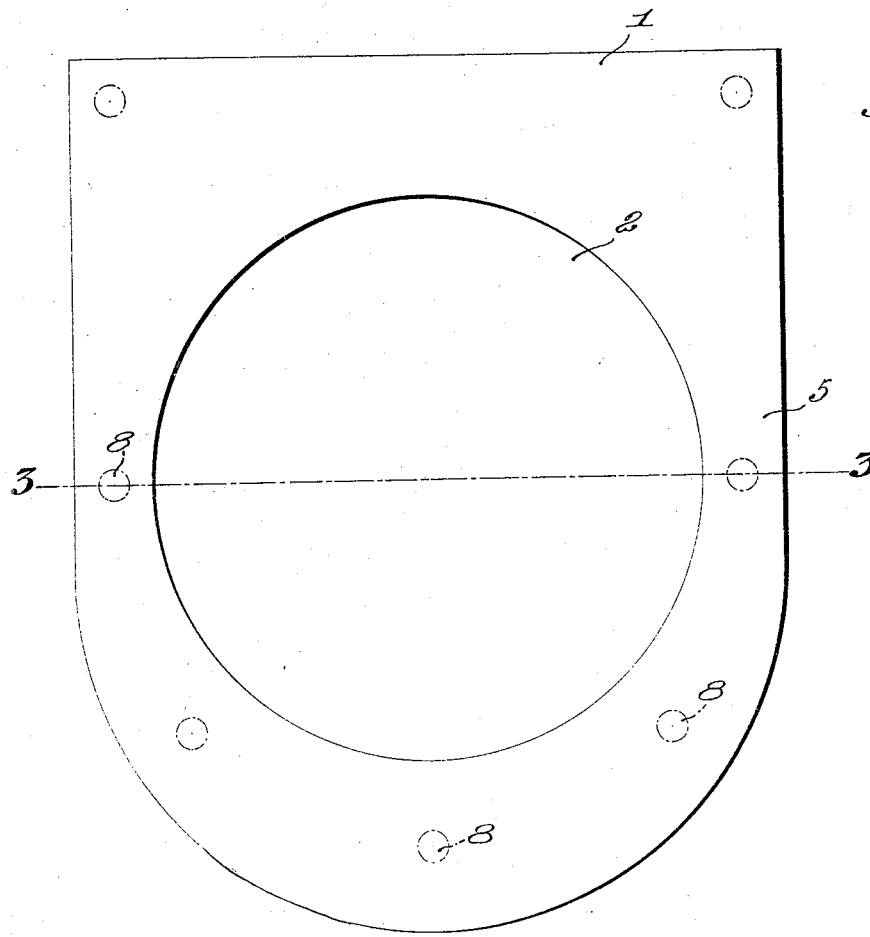
Figure 2:
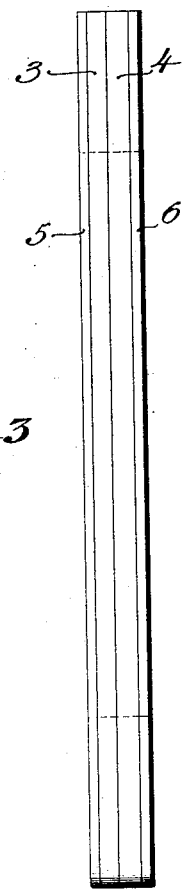
Figure 3:
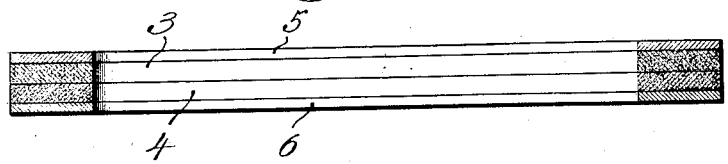

In the accompanying drawings illustrating the preferred form of the invention, Fig. 1 is an elevation of a guard, Fig. 2 an edge view, and Fig. 3 a section on the line 3—3, Fig. 1.

The dust guard indicated in a general way by the reference character 1, has the usual outline and the usual axle hole 2. The body portion of the guard consists of layers 3 and 4 of paper-like felt. This felt is preferably the ordinary, soft leatherboard of commerce, consisting of 80% leather and 20% paper stock, but it is immaterial what its composition may be, so long as it is fibro-cellular, paper-like, flexurally weak, absorbent, elastic and compressible. Reinforcing layers 5 and 6 are provided upon both sides of the guard. These reinforcements are of hard fibreboard of such strength as to give stiffness to the guard. They are of fibro-cellular, paper-like material, flexurally strong, non-absorbent and non-compressible. The several layers of the dust guard are united by glue. Any glue unaffected by oil or grease, or by the moderate heat to which the journal box may be exposed in use, is suitable for the purpose of uniting the several layers of the guard into one structure. The layers 3 and 4 are coated on their adjacent sides with glue or cement, and the glue or cement is used to unite the layers to each other and to the reinforcing layers 5 and 6.

So far as is at present known, the material which is best adapted for use as the glue or cement for uniting the layers of the dust guard, is rubber latex cement. This is preferred because it has been found to be unaffected by water, and unaffected by oil, even at high temperatures. This is done by coating the body layers 3 and 4 on both sides, and by coating the reinforcing layers on one side, and assembling the several layers together and uniting them by pressure into one strong structure.

Heretofore it has been the practice to cause the several layers of the dust guard prior to being riveted together to be temporarily united at different points on their surfaces by the blow of a hammer applied to a number of points around the dust guard. The only places where the layers were united, according to that method of procedure, were at the places where the hammer blows were applied.

The method of making the guard of the present invention contemplates cutting out blanks 3 and 4 of the paper-like felt, blanks 5 and 6 of the reinforcing material, and scarifying one side of each of the reinforcing layers and both sides of both of the body layers 3 and 4, then applying cement to the scarified surfaces and assembling the elements, first temporarily by means of a moderate pressure, and then permanently by a heavy compression. The preliminary moderate pressure is carried out while the elements are maintained in proper relative positions and assembled about a hole-mandrel, the pressure applied being insufficient to cause substantial reduction in thickness of the guard. This operation is not essential and may be omitted, but is desirable because it positions the layers for the subsequent compressing operation and also insures the formation of smooth surface about the axle hole. The final pressing operation is carried out in a heavy press, by placing the guard in proper position on a mandrel, and then bringing the jaws of the press carrying the mandrel together to subject the guard to a heavy pressure over the entire area of the guard. By this means the guard is substantially reduced in thickness, in ordinary practice the reduction being from 1/16 to 1/8 of an inch, thereby compacting the fibres of the body portion together and uniting the body layers and the reinforcing layers of the guard over their entire areas and uniting them together so securely that the guard is found to have enormous flexural strength, whereas a guard united by merely tacking the surfaces together with rivets, or by adhesion, at a number of points, is capable of being bent and distorted by the hands. This is because the reinforcing layers constitute the tension and compression portions of the guard. This material being held from slipping upon the central portion of the guard is called upon to endure on the top a compression and on the bottom a tensile stress. It is, of course, the extreme elements of the cross-section area which confer the greatest strength upon the material, because the radius of gyration is the greatest at this point, whereas a guard made up of a similar series of layers, only attached together by rivets or by adhesion at various separated points, has only slightly greater flexural strength than the sum of the individual elements. In the case of the guard here under consideration, a new quality is conferred upon it by rendering it by the compression and adhesion of the several layers into a substantially integral, unitary structure of great flexural strength. Besides, in the operation of compressing the guard, the presence of the mandrel in the hole of the guard while it is being compressed serves to secure a finish to the inside hole, and a regularity of outline which is such as to nicely receive the portion of the car axle upon which the dust guard is adapted to be carried.

After the guard is thus assembled and compressed, it may be provided with rivets or not, as desired or specified. Heretofore guards of this general type have been riveted together, and where the railroad specifications require, this practice may be continued, but it has been found that this guard is of sufficient strength and rigidity to support itself in position in the journal boxes without rivets, and in the preferred form of the guard the rivets are not employed. When rivets are used they will be placed approximately in the dotted line positions indicated at 8 in Fig. 1.

The guard is now immersed in a body of melted water-proofing material composed of paraffine, 75%, and resin, 25%. This material does not penetrate deeply into the guard, but protects it against the deteriorating influence of its hygroscopic quality—it prevents it from absorbing sufficient moisture and oil to cause or permit expansion of the compressed body and separation of the layers, thus preserving the guard in its condition of strength and thickness until it is used, so that when first inserted in the car axle box it therefore has the desired thickness and a skim coating of unguentous material which, by pressure against the axle where the guard comes in contact therewith, causes the axle to polish and smooth and press the edges of the hole in the guard. After being dipped in the melted unguentous, water-proofing material, the guard is allowed to drain off any surplus, and it is then ready for packing and shipping.

The guard is enormously stronger than any previous guard made of paperboard, felt, leatherboard, asbestos or wood, and maintains its shape in use with great durability. Its surfaces permit the creeping of a small quantity of oil to the axle opening, and its close fit on the axle prevents the ingress of water and dust to the box. Its durability enables it to perform this function for great lengths of time, and to withstand the severe stresses to which it is occasionally subjected on the frogs and rail-ends in use.

The guard is especially commended by its positive qualities above referred to, and also by its inexpensive character, as it can be manufactured and sold at a price greatly below that of any guard heretofore offered on the market which has any comparable qualities.

In the broader aspects of the present invention it is immaterial whether the intermediate portion of the guard be made of two layers, as shown in the drawings, or of one layer, as only a limited degree of strength is required of this portion of the guard. The outer layers are required to be of stiff, strong material, capable of withstanding high tensile and compressive stresses.

Having thus described the invention, what is claimed is:

The method herein described of forming a dust guard for axle boxes consisting in first cutting the essential forms or laminations from a porous cellular paper-like material for the inside layers and from a hard manufactured fiberboard for the outside layers whose contacting surfaces are more or less rough, coating such contacting surfaces of said laminations with a desirable cement or glue for collective assembling of the laminations of material in their desired positions, submitting them to preliminary pressure in order to retain them in their proper positions for further handling, then submitting said assembled layers of fibrous material to great pressure, thus substantially reducing the natural cellular porous formation of the inside layers of paper-like cellular materials and reducing the same to a highly compacted condition.

In testimony whereof I have signed my name to this specification.

FRANKLIN V. CHANEY.